United States Patent [19]

Kawaguchi

[11] Patent Number: 5,277,498
[45] Date of Patent: Jan. 11, 1994

[54] LINEAR GUIDE DEVICE
[75] Inventor: Takahiro Kawaguchi, Tokyo, Japan
[73] Assignee: THK Co., Ltd., Tokyo, Japan
[21] Appl. No.: 809,508
[22] PCT Filed: May 16, 1991
[86] PCT No.: PCT/JP91/00646
    § 371 Date: Mar. 23, 1992
    § 102(e) Date: Mar. 23, 1992
[87] PCT Pub. No.: WO91/18219
    PCT Pub. Date: Nov. 28, 1991
[30] Foreign Application Priority Data
    May 21, 1990 [JP] Japan .................. 2-130965
[51] Int. Cl.5 ............... F16C 29/06; F16H 27/02
[52] U.S. Cl. ............................. 384/45; 74/89.15
[58] Field of Search ............... 384/43, 44, 45; 74/89.15

[56] References Cited

U.S. PATENT DOCUMENTS

| | | | |
|---|---|---|---|
| 4,632,573 | 12/1986 | Itoh | 384/45 X |
| 4,674,893 | 6/1987 | Teramachi | 384/43 X |
| 4,932,279 | 6/1990 | Kasuga | 384/45 X |
| 4,934,202 | 6/1990 | Hikita et al. | 74/89.15 |
| 4,983,049 | 1/1991 | Lecomte | 384/45 |
| 5,074,160 | 12/1991 | Kusuga | 384/45 X |
| 5,076,713 | 12/1991 | Morita | 384/45 |

FOREIGN PATENT DOCUMENTS

| | | |
|---|---|---|
| 443098 | 8/1991 | European Pat. Off. ........ 384/45 |
| 58-34225 | 2/1983 | Japan . |
| 84421 | 5/1985 | Japan . |
| 11207 | 3/1987 | Japan . |
| 200016 | 9/1987 | Japan . |

Primary Examiner—Thomas R. Hannon
Attorney, Agent, or Firm—Armstrong, Westerman, Hattori, McLeland & Naughton

[57] ABSTRACT

A linear guide device which comprises a track bed having a substantially rectangular section opened at one side and is provided at its inner surfaces with rolling surfaces for rolling members; and a bearing block which has load rolling surfaces cooperating with the rolling surfaces to hold the rolling members therebetween and moves in a hollow portion of the track bed in accordance with rotation of a feed screw shaft engaging the bearing block. The bearing block is formed of a block body, rolling aperture forming plates and covers which are jointed together to entirely form ball circulation paths through which no-load balls circulate. Therefore, a long bearing block can be facilely manufactured, and thus a number of the rolling members can be increased for achieving the linear guide device having a large maximum allowable load and a compact configuration.

1 Claim, 10 Drawing Sheets

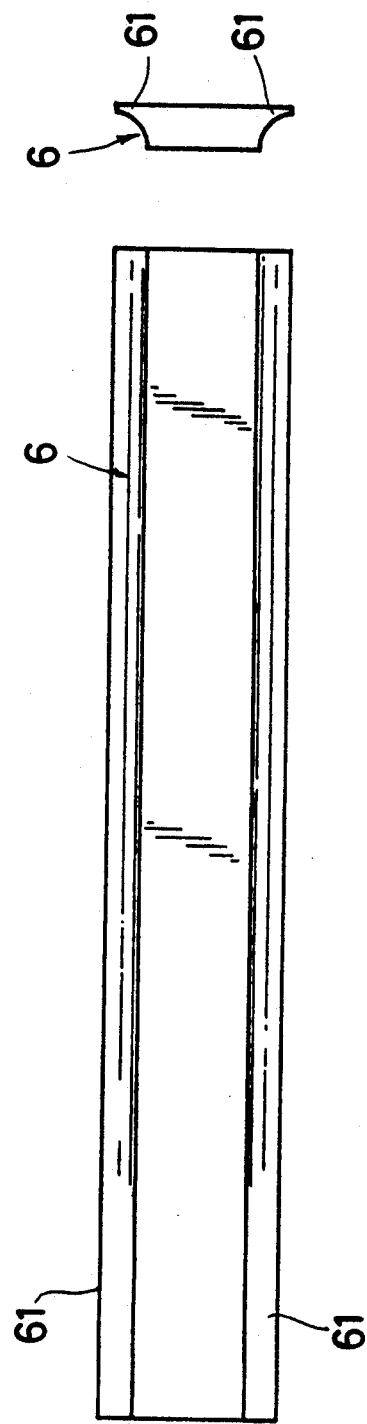

LINEAR GUIDE DEVICE

BACKGROUND OF THE INVENTION

1. Field of the Invention

The present invention relates to a linear guide device used, for example, in a linear motion component of a machine tool or an industrial robot.

2. Description of the Related Art

A linear guide device of a type described above has been disclosed in Japanese Laid-Open Patent publication No. 62-200016. Specifically, as shown in FIG. 17, a bearing block (a) (which will be called merely a "block") is provided at its opposite side surfaces with load ball grooves (c) in which balls (b) rolls. A pair of track beds (d) is disposed with the block (a) therebetween. The beds (d) are provided with ball rolling grooves opposed to the load ball grooves (c). The balls (b) held between the load ball grooves (c) and the ball rolling grooves support the block (a) so that the block (a) may be movable along the track beds (d).

A screw shaft (f) of a feed screw mechanism is engaged with a central portion of the block (a), so that the screw shaft (f) may be rotated to move the block (a) along the track beds (d).

According to this linear guide device, since the bearing block for supporting a movable member such as the table is constructed integrally with the feed screw mechanism for applying a driving force for the linea motion to the movable member, a compact construction of the device can be achieved, and a height of the movable member can be minimized, which enables a stable motion.

However, with respect to the bearing block of the linear guide device described above, opposite ends of each load ball groove must be connected by a ball circulation path so as to guide or introduce the balls from a termination end of the load ball groove to a start end of the load ball groove again.

In the prior art, the ball circulation path is generally formed of a no-load ball rolling aperture, which is formed in the block to correspond to each load ball groove, and ball return paths, each of which connects an end of the ball load groove and an end of the no-load ball rolling aperture.

However, the no-load ball rolling aperture is a very small aperture having a diameter only slightly larger than that of the ball, and thus it is difficult to form a long no-load ball rolling aperture by drilling. Therefore, machining of the no-load rolling aperture restricts increase of a length of the block, and thus restricts the length of the load ball groove.

Generally, in a bearing which employs rolling members such as balls for bearing the motion between two objects, a maximum allowable load may be increased by ① increasing sizes of the rolling members, or ② increasing numbers of the rolling members which rolls on the load rolling groove. However, the latter can be hardly applied to practical products because the lengths of the load ball grooves are restricted due to the above described reason.

The present invention is devised in view of the above problems. It is an object of the invention to provide a linear guide devide, which allows easy formation of no-load rolling apertures for rolling members and has a large maximum allowable load and a small sizes.

SUMMARY OF THE INVENTION

In order to achieve the above objects, a linear guide device of the invention comprises: a track bed which has a substantially rectangular section opened at one side and is provided at its inner surfaces with rolling surfaces for rolling members; and a bearing block which has load rolling surfaces cooperating with said rolling surfaces to hold the rolling members therebetween and moves in a hollow portion of the track bed in accordance with a degree of rotation of a feed screw shaft engaging the bearing block, wherein said bearing block has a block body which includes a ball-nut portion engaging the feed screw shaft, a pair of bearing portions projected from the ball-nut portion and the load rolling surfaces formed at ends of the bearing portion, said bearing block further includes a rolling aperture forming plate which cooperates with the bearing portions to form the no-load rolling apertures for the rolling members, and covers which are engaged with front and rear end surfaces of the block body, and said covers form return paths for the rolling members which connect the load rolling surfaces and the no-load rolling apertures, respectively.

According to the embodiment of the invention described above, the load rolling surfaces formed on the bearing block may be appropriately varied with respect to its configurations including a number of the surfaces and a contact angle thereof to the rolling members, provided that the load rolling surfaces can bear the load applied to the block, and that the variation does not apply the load to the screw shaft engaging the block body.

In a construction in which the no-load rolling apertures are formed by the bearing portions of the block body and the rolling aperture forming plates engaging them, the apertures may be formed by no-load rolling grooves provided in the block body and closed or covered with the rolling aperture forming plates, or conversely, may be formed by the no-load rolling grooves provided in the rolling aperture forming plates engaging the block body.

Further, the rolling members used in the invention may be appropriately selected from balls, rollers and others.

According to the above embodiment, since the no-load rolling apertures in the bearing block are formed by attaching the rolling aperture forming plates to the block body, the no-load rolling apertures can be facilely manufactured by forming grooves for receiving the rolling members in one or both of the members, which facilitates manufacturing of the long bearing.

Since the bearing block is formed by attaching the rolling aperture forming plates and the covers to the block body, the block body may have a vertically and laterally symmetrical configuration which allows manufacturing of the long body by drawing.

Further, since the rolling aperture forming plate forms one side of the no-load rolling aperture, collision noises of the rolling members during rolling thereof in the no-load rolling apertures can be sufficiently prevented by employing plates made from resin.

BRIEF DESCRIPTION OF THE DRAWINGS

FIGS. 15 and 16 are a side view and an elevation of a ball retainer; and

DESCRIPTION OF THE REFERENCE NUMERALS

Figure 1:
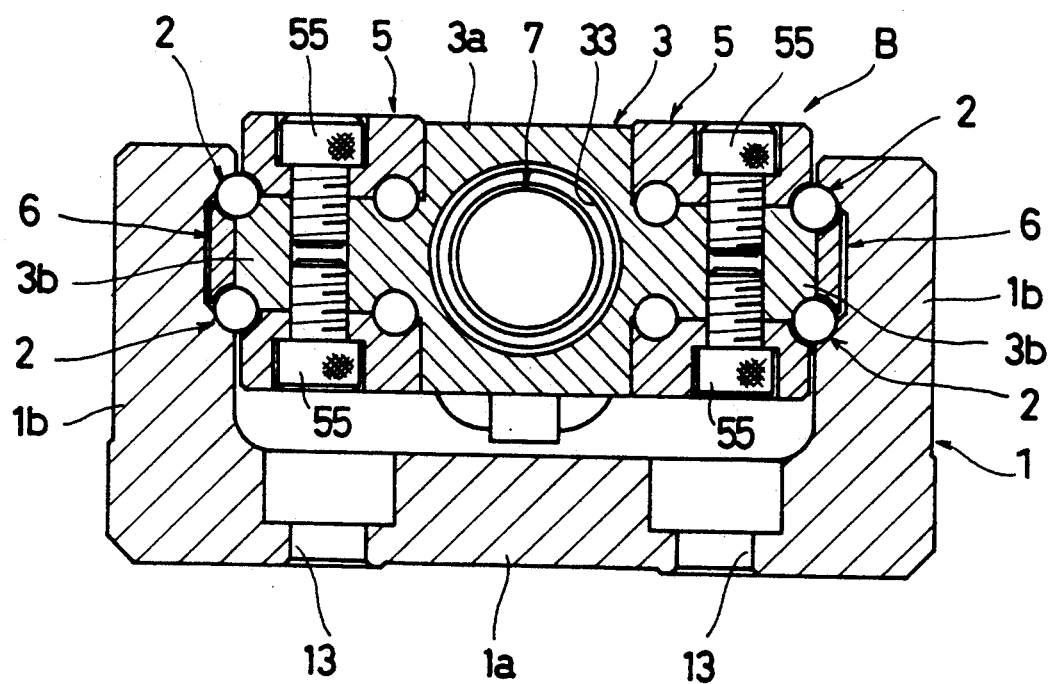
FIG. 1 is a cross section illustrating a first embodiment of a linear guide device according to the invention.

| DESCRIPTION OF THE REFERENCE NUMERALS | |
|---|---|
| 1: track bed | 2: ball (rolling members) |
| 3: block body | 3a: ball-nut portion |
| 3b: bearing portion | 4: cover |
| 5: rolling aperture forming plate | 12: rolling surface |
| 7: screw shaft | |
| 31a–31d: load ball grooves (load rolling surface) | |
| B: bearing block (block) | |

DETAILED DESCRIPTION OF THE PREFERRED EMBODIMENTS

A linear guide device of the invention will be described in greater detail with reference to the accompanying drawings.

Figure 2:
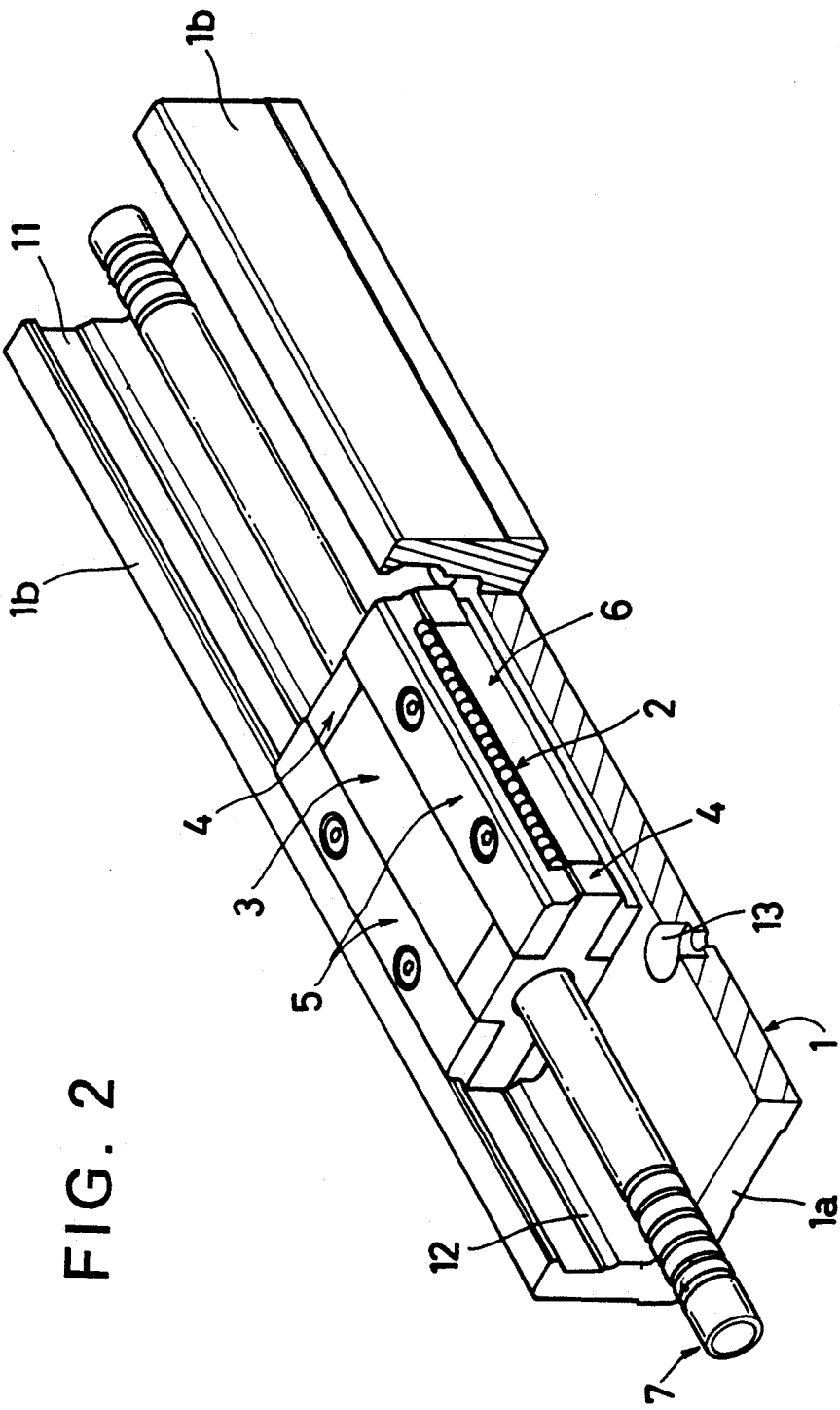
FIG. 2 is a perspective view with a certain part cut away.

FIGS. 1 and 2 illustrate a first embodiment of the linear guide device of the invention, which is basically formed of a track base or bed 1 having a substantially rectangular section opening at one side and fixed to, e.g., a bed, a substantially rectangular bearing block B (will be also called as a "block") engaging a screw shaft 7 of a feed screw mechanism for moving in a concave portion of the track bed 1, and a plurality of balls 2 or rolling members which bear loads between the block B and the track bed 1 during rolling therebetween.

Figure 3:
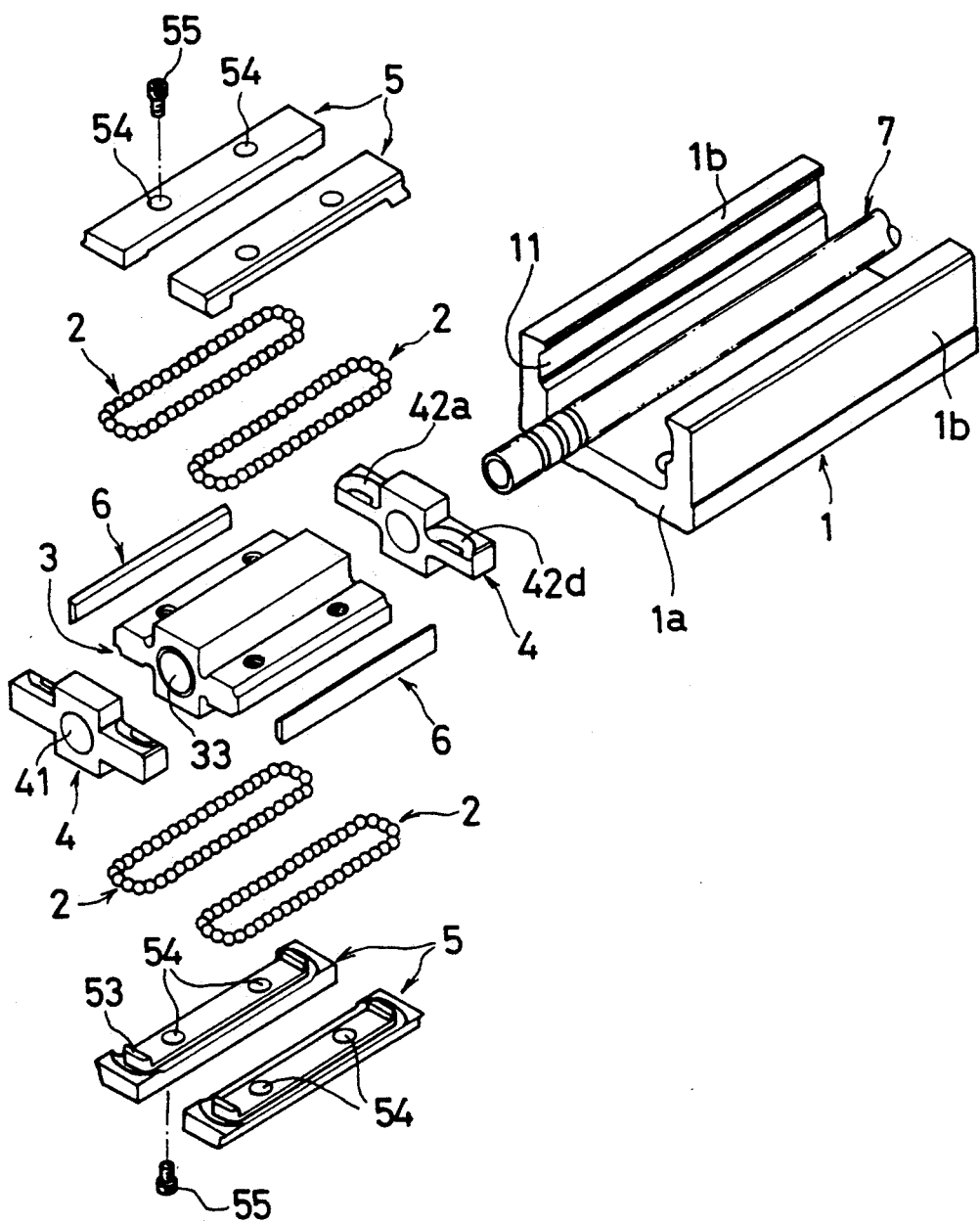
FIG. 3 is an exploded view illustrating components of a linear guide device according to the first embodiment.
Figure 4:
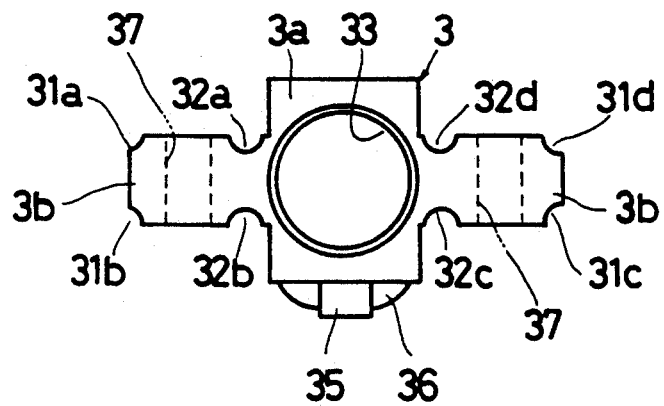
FIGS. 4–7 are an elevation, a side view, a top view and a bottom view illustrating a block body, respectively.
Figure 5:
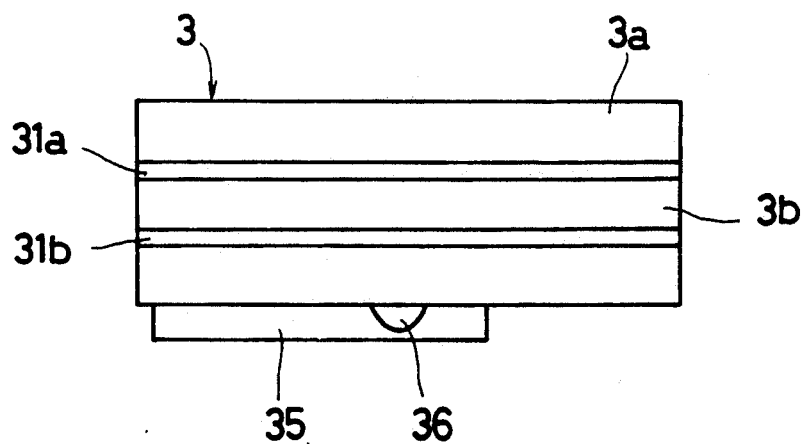
Figure 6:
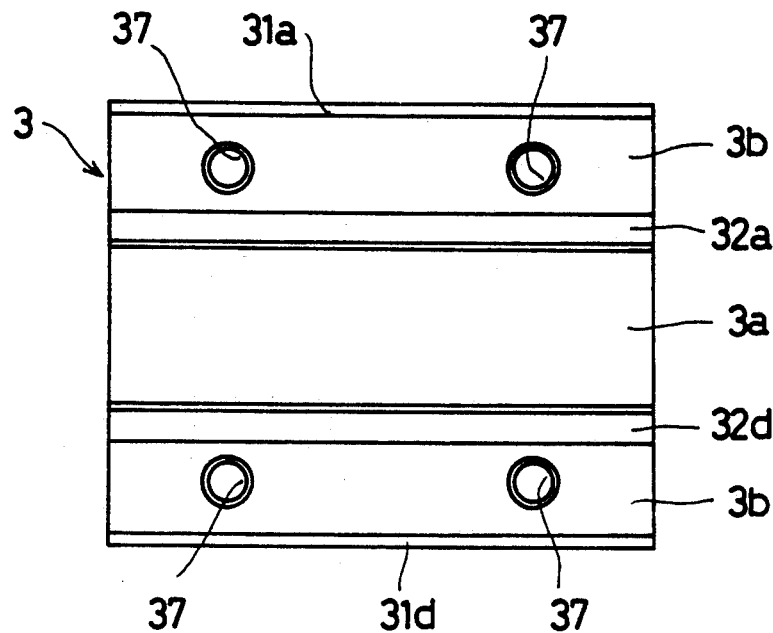
Figure 7:
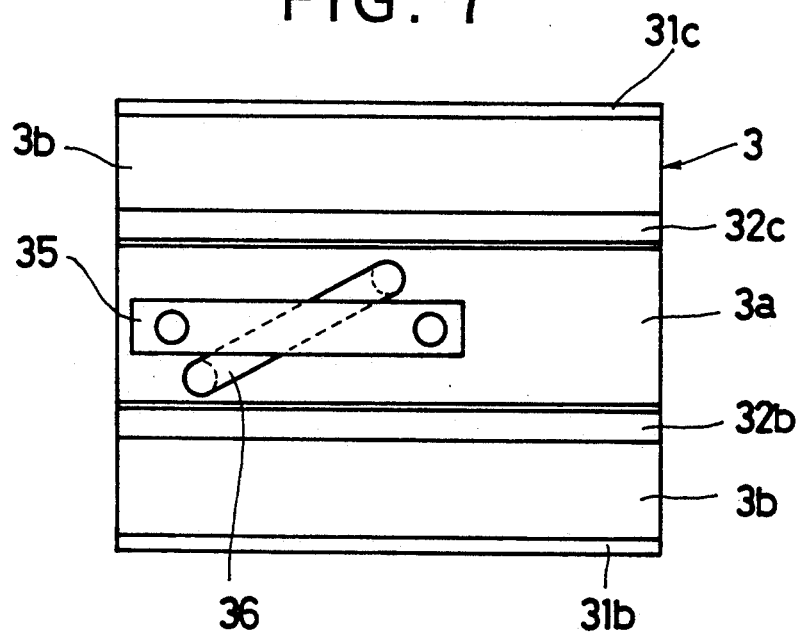

The block B is formed of, as shown in FIG. 3, a block body 3 engaging the feed screw shaft 7, covers 4 attached to front and rear end surfaces of the block body 3, rolling aperture forming plates 5 engaging four corners of the block body 3, and a pair of ball retainers 6 engaging side surfaces of the block body 3.

The block body 3 includes, as shown in FIGS. 4–7, a ball-nut portion 3a engaging the screw shaft 7 and a pair of bearing portions 3b, and thus has a section similar to a cross. Each bearing portion 3b is provided at corners or edges with a pair of load ball grooves 31a and 31b, or 31c and 31d, in which the balls 2 rolls. No-load ball grooves 32a–32d for circulating the balls which roll from ends of the load ball grooves 31a–31d are formed at corners between the bearing portions 3b and the ball-nut portion 3a. Each bearing portion 3b is provided with tapped bolt apertures 37 into which attaching bolts 55 are screwed for attaching the rolling aperture forming plates 5.

Figure 8:
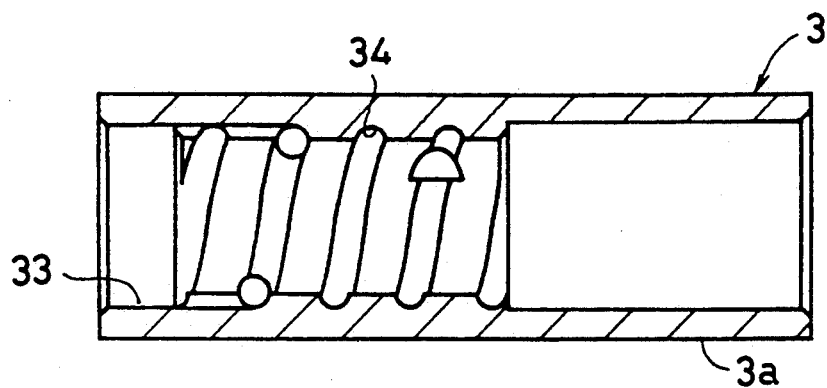
FIG. 8 is a longitudinally sectional view illustrating a ball-nut portion of the block body.

The ball-nut portion 3a engaging the screw shaft 7 is provided with, as shown in FIG. 8, a through aperture 33 having a diameter slightly larger than the screw shaft 7 and a rolling groove 34 which is formed at a portion of the through aperture 33 and corresponds to a spiral ball rolling groove on the screw shaft 7. Further, a return tube 36 is fixed to the ball-nut portion 3a by a holder member 35 to form a circulation path. Pre-loads are applied to balls (not shown) disposed between the screw shaft 7 and the block body 3 for increasing the accuracy of motion of the block B.

Since the block body 3 thus constructed has a vertically and laterally symmetrical configuration, it can be manufactured by drawing without utilizing conventional machining such as cutting. Specifically, the block body 3 can be manufactured in such a manner that the drawing is applied to a steel member to form the above sectional shape and then polishing for the load ball grooves 31a–31d and drilling for the through apertures 33 are applied to it. According to this manufacturing method, block bodies 3 having intended lengths can be facilely manufactured by appropriately cutting the drawn steel member into pieces.

Figure 9:
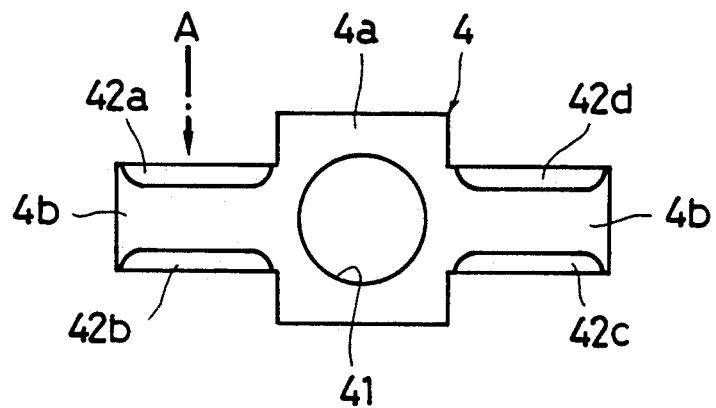
FIGS. 9 and 10 are a front view and a rear view of a cover.
Figure 10:
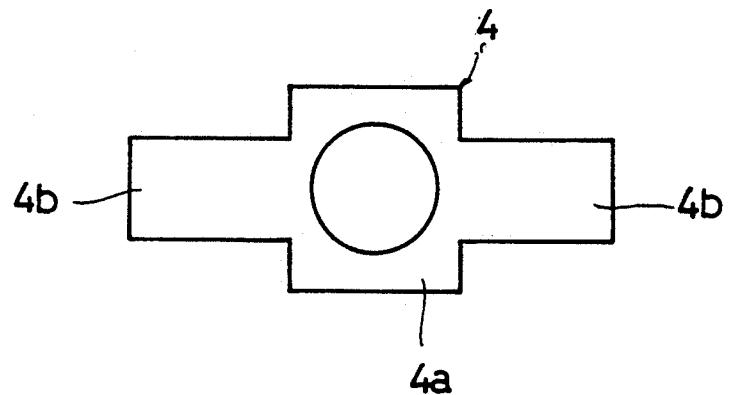
Figure 11:
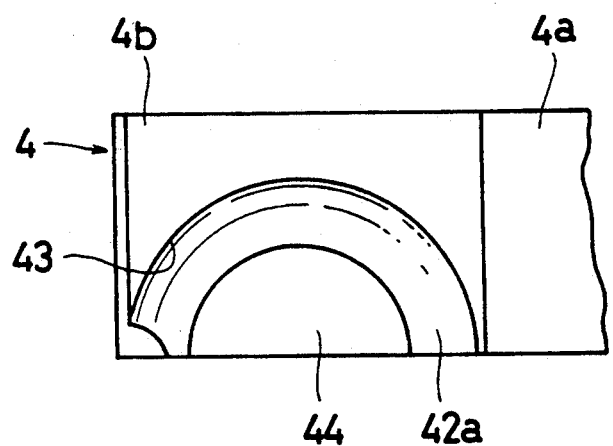
FIG. 11 is a view taken along an arrow A in FIG. 9.

The cover 4 has a sectional shape similar to a cross, as shown in FIGS. 9 and 10, and includes a base 4a and a pair of arms 4b projected therefrom. The cover 4 is formed by injection molding of synthetic resin. The base 4a is provided with a through aperture 41 into which the screw shaft 7 is inserted. Each projected arm 4b is provided at its opposite side surfaces with ball return grooves 42a–42d for connecting the load ball grooves 31a–31d on the block body 3 and the corresponding no-load ball grooves 32a–32d to each other (see FIG. 11). In FIG. 11, a numeral 43 indicates one of projections for scooping and guiding the balls 2, which roll from the load ball grooves 31a–31d, into the ball return grooves 42a–42d. A numeral 44 indicates one of positioning seats for bearing the guide projections 53 which will be described later and are provided in the rolling aperture forming plates 5.

Figure 12:
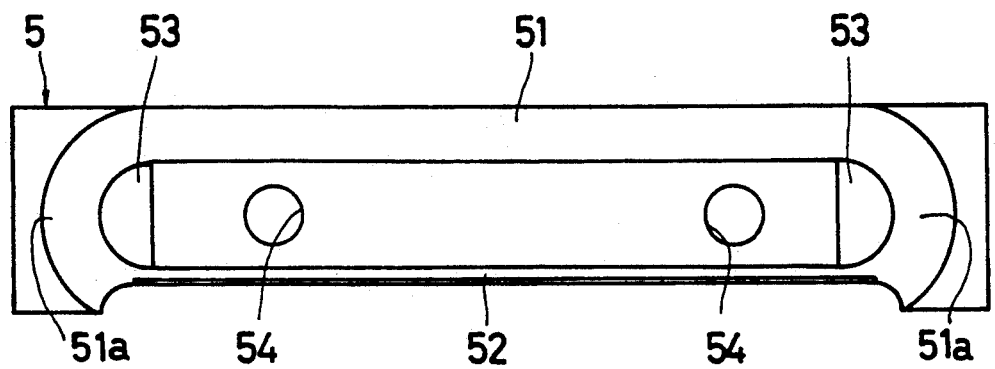
FIGS. 12 and 13 are a rear view and a side view illustrating a rolling aperture forming plate.
Figure 13:
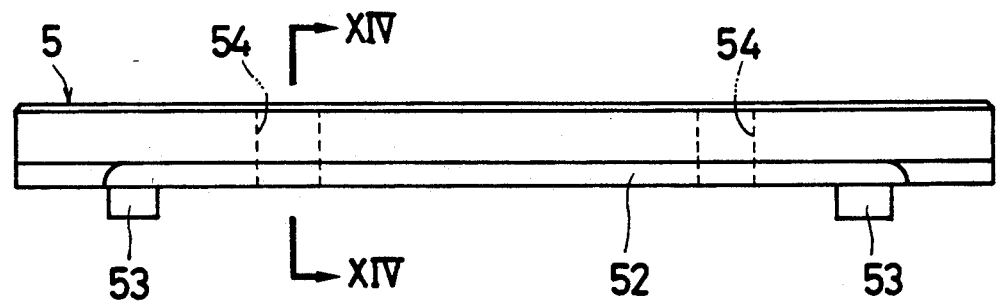
Figure 14:
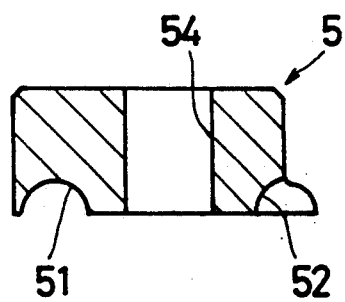
FIG. 14 is a cross section taken along line XIV—XIV in FIG. 13.
Figure 17:
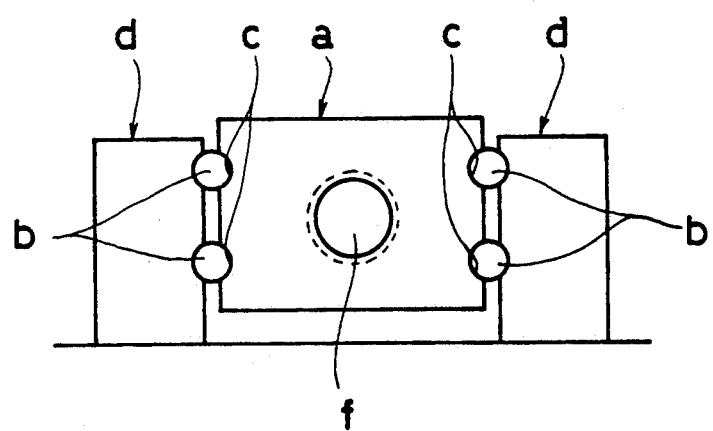
FIG. 17 is a cross section illustrating a linear guide device of the prior art.

The rolling aperture forming plates 5 are manufactured by injection molding of synthetic resin, similarly to the covers 4. As shown in FIGS. 12–14, the plates 5 each are provided at one surface with ball circulation grooves 51 corresponding to the no-load ball grooves 32a–32d on the block body 3 and the ball retrn grooves 42a–42d on the covers 4. Also, the plates 5 each are provided at one side edge with a ball retaining groove 52 which connects to the ball circulation groove 51 and corresponds to the load ball groove 31a–31d of the block body 3. Further, inside return portions 51a of the ball circulation paths 51, the guide pieces 53 are projected for positioning the plates 5 with respect to the block body 3 or the covers 4. In an assembly of the block B, each pair of the guide pieces 53 engage the front and rear end surfaces of the bearing portion 3b for positioning the block body 3, and rest on the positioning seats 44 of the covers 4 for positioning the covers 4. Numerals 54 indicate penetrated apertures through which attaching bolts 55 are inserted for attaching the plates 5 to the block body 3.

The ball retainer 6 is a rod-like member having a nearly trapezoid shape, as shown in FIGS. 15 and 16, and has a width so determined that a gap between the projected end 61 of the retainer 6 attached to the block body 3 and the ball retaining groove 52 on the rolling aperture forming plate 5 may be smaller than the diameter of the ball 2, whereby the balls 2 are prevented from disengaging from the load ball grooves 31a-31d when the block B is removed from the track bed 1.

The track bed 1 has a nearly rectangular shape opened at one side and includes a fixing portion 1a fixed to a basic member such as a bed, and a pair of support portions 1b projected from the opposite ends of the fixing portion 1a for supporting the block body 3. Each supporting portion 1b is provided at its inner surface with a groove 11, and the grooves 11 are provided at their upper and lower corners with ball rolling grooves 12a-12d opposed to the load ball grooves 31a-31d of the block body 3, respectively. A numeral 13 indicates one of bolt holes into which fixing bolts for fixing the track bed 1 are inserted.

In the construction described above, the bearing block B is assembled by attaching the covers 4 to the front and rear end surfaces of the block body 3 by screws (not shown), attching the four rolling aperture forming plates 5 to the bearing portions 3b of the block body 3 and attaching the ball retainers 6 to the side surfaces of the bearing portions 3b by screws (not shown).

Therefore, in the illustrated embodiment, the no-load ball rolling apertures corresponding to the load ball grooves 31a-31d is formed of the no-load ball grooves 32a-32d on the block body 3 and the ball circulation grooves 51 on the rolling aperture forming plates 5 opposed thereto. Further, the ball return paths which connect the no-load ball rolling apertures and the load ball grooves 31a-31d are formed of the ball return grooves 42a-42d on the covers 4 and the ball circulation grooves 51 on the plates 5 faced thereto.

In this construction, the no-load ball grooves 31a-31d are facilely formed by applying milling to the block body 3 and the ball return grooves 42a-42d and the ball circulation grooves 51 are facilely formed by the injection molding of the covers 4 and the rolling aperture forming plates 5, respectively. Therefore, even in the long block B, the no-load ball rolling apertures can be facilely and accurately formed.

Since the balls 2 are covered with the plates or covers 4 made from the synthetic resin while they are rolling the ball circulation paths, noises which may be caused by circulation of the balls can be reduced.

According to the linear guide device of the invention, as described hereinabove, the no-load rolling apertures can be facilely formed by machining the grooves for receiving the rolling members in the block body and/or the rolling aperture forming plates, so that the long bearing block can be facilely manufactured, and thus the number of the load rolling members can be increased to obtain the linear guide device having an increased maximum allowable load and a compact configuration.

Since the block body having an intended length can be manufactured by cutting a drawn member, the productive efficiency can be increased and the costs can be reduced.

Further, owing to the rolling aperture forming plates made from resin, the collision noises of the rolling members during rolling in the no-load apertures can be minimized, and thus the linear guide device having a small operation noise can be obtained.

What is claimed is:

1. A linear guide device comprising:

a track bed having a substantially rectangular section open at one side and provided at its inner surfaces with rolling surfaces for rolling members; and a bearing block having load rolling surfaces cooperating with said rolling surfaces to hold the rolling members therebetween and moving in a hollow portion of the track bed in accordance with a degree of rotation of a feed screw shaft engaging the bearing block, wherein said bearing block has a block body which includes a ball-nut portion engaging the feed screw shaft, a pair of bearing portions projecting from both sides of the ball-nut portion and the load rolling surfaces formed at corners or edges of the bearing portion, and, thus constructed, having a vertically and laterally symmetrical configuration.

said bearing block further including four rolling aperture forming plates engaged with upper and lower sides of said bearing portions, and cooperating with the bearing portions to form no-load rolling apertures for the rolling members, and covers which are engaged with front and rear end surfaces of the block body, and said covers forming return paths for the rolling members which connect the load rolling surfaces and the no load rolling apertures, respectively.

* * * * *